United States Patent [19]

McKinnon

[11] Patent Number: 4,634,083
[45] Date of Patent: Jan. 6, 1987

[54] HELICOPTER SEAT ISOLATION SYSTEM

[75] Inventor: Gordon M. McKinnon, Montreal, Canada

[73] Assignee: CAE Electronics Ltd., Montreal, Canada

[21] Appl. No.: 802,739

[22] Filed: Nov. 29, 1985

Related U.S. Application Data

[63] Continuation-in-part of Ser. No. 649,508, Sep. 11, 1984, abandoned.

[51] Int. Cl.$^4$ ............................................. B64D 25/04
[52] U.S. Cl. ........................... 244/122 R; 297/DIG. 3; 297/284
[58] Field of Search ........................ 244/122 R, 17.27; 248/550; 297/DIG. 3, 284, 330

[56] References Cited

U.S. PATENT DOCUMENTS

| | | | |
|---|---|---|---|
| 2,938,570 | 5/1960 | Flajole | 155/5 |
| 2,964,272 | 12/1960 | Olson | 248/550 |
| 3,097,436 | 7/1963 | Gaucher | 35/12 |
| 3,136,577 | 6/1964 | Richard | 297/180 |
| 3,202,388 | 8/1965 | Goodwin | 248/8 |
| 3,270,440 | 9/1966 | Radosevic, Jr. | 35/12 |
| 3,279,201 | 10/1966 | Wortz et al. | 62/62 |
| 3,317,934 | 5/1967 | Hinrichs | 5/349 |
| 3,352,029 | 11/1967 | Callanen | 35/12 |
| 3,635,427 | 1/1972 | Balke | 248/550 |
| 3,701,499 | 10/1972 | Schubert et al. | 244/17.27 |
| 3,982,786 | 9/1976 | Burgin et al. | 297/284 |
| 3,983,640 | 10/1976 | Cardullo et al. | 35/12 E |
| 4,003,534 | 1/1977 | Kenigsberg et al. | 244/122 R |
| 4,040,655 | 8/1977 | Garrick et al. | 296/63 |
| 4,059,909 | 11/1977 | Kron | 35/12 E |
| 4,164,079 | 8/1979 | Ashworth | 35/12 E |
| 4,198,025 | 4/1980 | Lowe et al. | 248/550 |
| 4,243,024 | 1/1981 | Crosbie et al. | 128/1 A |
| 4,321,044 | 3/1982 | Kron | 434/59 |
| 4,384,700 | 5/1983 | Thompson et al. | 248/550 |
| 4,408,744 | 10/1983 | Thompson | 248/636 |

Primary Examiner—Galen Barefoot
Assistant Examiner—Lynn M. Fiorito
Attorney, Agent, or Firm—Schwartz, Jeffery, Schwaab, Mack, Blumenthal & Evans

[57] ABSTRACT

A system for counteracting the effect of helicopter vibrations on a seat in the helicopter which seat includes a plurality of controllable air cells includes a means for varying the pressure of the cells and transducer means for sensing cell pressure and vibrations and for providing electrical signals representative thereof. Control means provide signals for controlling the means for varying and processing means process the electrical signals and provide driving signals for driving the control means. A processing means converts the electrical signals to provide driving signals which drive the control means to control the means for varying so as to counteract the changes in pressure in the air cells due to vibrations to eliminate or reduce the changes in pressure with this system, the pilot is isolated from the helicopter compared with prior art systems where the seat is isolated from the helicopter.

4 Claims, 1 Drawing Figure

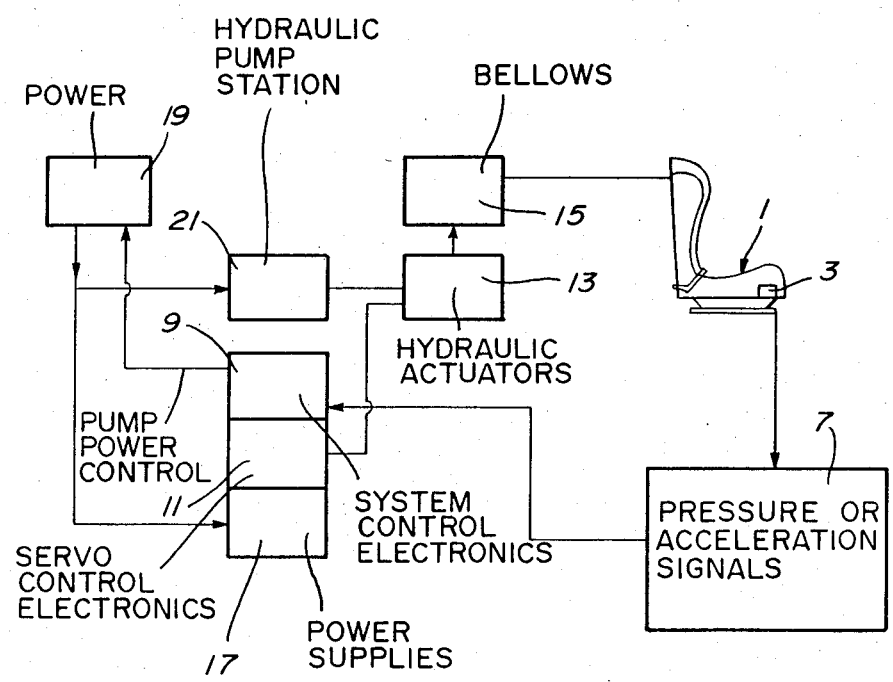

4,634,083

HELICOPTER SEAT ISOLATION SYSTEM

CROSS-REFERENCE TO RELATED APPLICATION

This application is a C-I-P of U.S. patent application Ser. No. 649,508, filed Sept. 11, 1984, now abandoned.

BACKGROUND OF INVENTION

1. Field of the Invention

The invention relates to a system for counteracting the effect of helicopter vibrations on a seat in the helicopter, which seat includes a plurality of controllable air cells. More specifically, the invention relates to such a system wherein the effects of the vibrations are counteracted by controllably adjusting the pressure in the air cells to counteract the changes in pressure in the air cells due to the vibrations.

2. Description of Prior Art

Sustained helicopter vibration can have harmful and injurious effects to the pilot of the helicopter and can adversely affect the pilot's comfort and performance. As eliminating or even reducing the vibrations is difficult and possibly even impossible, the only feasible approach to eliminating the harmful effects to the pilot is to counteract the effect of helicopter vibrations. The most reasonable approach is to counteract the effect of vibrations on the pilot seat in the helicopter.

For this purpose, an "active" seat is proposed, that is, a seat having a plurality of controllable air cells. Such seats are known in the art as illustrated in, for example, U.S. Pat. No. 3,270,440, Radosevic, Jr., Sept. 6, 1966, U.S. Pat. No. 4,059,909, Kron, Nov. 29, 1977, U.S. Pat. No. 3,983,640, Cardullo et al, Oct. 5, 1976, and U.S. Pat. 4,164,079, Ashworth, Aug. 14, 1979. The above patents all relate to seats for flight simulators, and the pressure of the controllable air cells is typically varied by, for example, hydraulic actuators and bellows. However, the seats are controlled to simulate pressures which would be felt due to the forces of acceleration of an aircraft in a simulated situation, and the pressures are controlled by computers which control the pressure in the air cells and in concert control other parameters of the flight simulators to give the impression of an aircraft in flight.

A similar approach is used in U.S. Pat. No. 3,097,436, Gaucher, July 16, 1963 except that here the pressure of fluid sacs which are attached to fixed walls in the simulator are used to provide the users of the simulator with a simulated feeling of motion.

Various approaches are known in the art for isolating a first body, which is connected to a second body, from the effects of vibration of the second body. One such approach is illustrated in U.S. Pat. No. 3,202,388. However, as can be seen, this is an entirely mechanical approach and would not be suitable for use in a helicopter environment.

A further approach from isolating a first body from a second body is illustrated in U.S. Pat. No. 3,701,499, Schubert et al, Oct. 31, 1972. This patent teaches an aircraft with an active seat, that is a seat which is adapted to be manipulated so as to reduce the effects of vibrations of the aircraft on the pilot sitting in the seat. However, in this case, it is the seat itself which is isolated from the aircraft. In fact, the pilot and the seat are considered as a single integral unit.

Although the approach in U.S. Pat. No. 3,701,499 yields satisfactory results, it is a difficult and expensive approach to implement. In fact, it requires a new seat mounting. As the position and nature of the seat mounting is a structural effect, implementing a seat of the type as taught in the patent requires not only a redesign of the seat but of the entire helicopter structure. As can be appreciated, substantial costs are involved in implementing this approach.

In addition, the seat in this approach remains unchanged so that it is not possible with the teachings of the U.S. Pat. No. 3,701,499, to provide differential pressures to different parts of the body of the pilot in the seat.

As will also be appreciated, it would be impossible to use the approach of U.S. Pat. No. 3,701,499 for the purpose of simply retro-fitting helicopters, or, more specifically, the seats in the helicopters. As mentioned, because of the structural effect of implementing this approach, and not only the seat, but the entire helicopter, must be redesigned.

SUMMARY OF INVENTION

It is therefore an object of the invention to provide a system for counteracting the effect of helicopter vibrations on a seat in the helicopter, which seat includes a plurality of controllable air cells.

It is a more specific object of the invention to provide such a system wherein the effects of the vibration are counteracted by controllably adjusting the pressure in the air cells to counteract the changes in pressure in the air cells due to the vibrations.

In accordance with a particular embodiment of the invention there is provided a system for counteracting the effect of helicopter vibrations on a seat in the helicopter, the seat comprising a plurality of controllable air cells. The system includes a means for fixedly connecting the seat to the helicopter during operation thereof and means for varying the pressure of the cells. Vibration transducer means sense pressure in at least one of the cells and provide electrical signals representative thereof. Control means provide signals for controlling the means for varying and processing means process the electrical signals and provide driving signals for driving the control means. An output of the transducer means is connected to a first input of the processing means, and an output of the processing means is connected to an input of the control means. An output of the control means is connected to the means for varying and the means for varying is physically connected to the controllable air cells. Thus, the effects of helicopter vibrations are counteracted by counteracting the changes of pressure in the air cells due to the vibrations and thereby reducing or eliminating the changes in pressure of the air cells.

BRIEF DESCRIPTION OF DRAWING

The invention will be better understood by an examination of the following description, together with the accompanying drawing, in which:

There is illustrated in block diagram from an embodiment of the inventive system.

DESCRIPTION OF PREFERRED EMBODIMENTS

Referring to the drawing, an "active" seat 1 comprises a plurality of controllable air cells as is well known in the art. Disposed in the seat, and specifically in each air cell of the seat, is transducer means 3 for detecting the pressure in the air cell and for providing an electrical signal representative of this pressure. Only one transducer has been shown, however, as will be appreciated, it is possible to measure the pressure in more than one, in fact each air cell so that a separate transducer can be provided for each air cell of the seat.

Means are provided for fixedly attaching the seat to the helicopter during operation. Although adjustment means may be provided for adjusting the position of the seat, it will nevertheless be fixed in position during operation. The significance of this will be discussed below.

The outputs of the transducer is fed to inputs of a processing circuit 7. The processing circuit 7 could be, for example, a controllable amplifier-inverter. As will be seen below, the output of 7 provides a signal for driving a control circuit. The processing circuit 7 insures that the transducer signal is converted to its proper polarity and amplitude for effectively driving the control circuitry to reduce the effects of helicopter vibrations on the helicopter seat.

The output of the processor circuit 7 is fed to an input of system control circuit 9 whose output is, in turn, fed to an input of servo control circuit 11. The function of 9, in addition to that of controlling 11, will be discussed below.

The output of the servo control system 11 is fed to the inputs of hydraulic actuators 13, and the hydraulic actuators, which are physically connected to bellows 15, will, in turn, drive respective ones of bellows 15. As will be understood, there will be a separate bellow for each controllable air cell in the seat so that the pressure of each air cell can be separately controlled. A separate hydraulic actuator is, in turn, connected to each respective bellow.

Power supply 17, which provides power for the electronic circuits, is fed from the helicopter power pack 19 which also provides power for the hydraulic pump station 21. The system control circuit provides control through the power pack 19 for the hydraulic pump station 21.

In operation, the system works as follows:

The purpose of the exercise is to maintain a steady air pressure in all of the air cells of the helicopter seat, that is, to maintain a zero change in air pressure in the seats. Pressure in the air cells will be varied due to the effects of helicopter vibrations, so that the purpose of the system is to provide signals for driving the bellows, which signals are opposite in effect to the vibration effect so that the net change in pressure of the air cells will be equal to zero or will approximate zero.

A closed loop is formed by the transducers 3, the processor 7, the control means 11, the hydraulic pump station 21, the hydraulic actuators 13, and the bellows 15. When the helicopter is subject to acceleration forces, these forces will be applied to the pilot who will then differentially effect the air cells 3 so to change the pressure in the air cells. This change of pressure will be detected by respective ones of the transducers 3, and these changes in pressure will be communicated to the processor 7. The processor will then instruct the control system to actuate the bellows so as to eliminate these changes in air pressures of the respective cells.

As the seat per se remains fixed during the operation, and as only the pressure in the cells is varying, it can be seen that in the present arrangement, the pilot is isolated from the helicopter acceleration forces. If it was the seat itself that was moved, then obviously it would be the seat which was being isolated from the helicopter forces as per the teachings of U.S. Pat. No. 3,701,499.

As above mentioned, the performance of the '499 patent does not differ greatly from the performance of the present arrangement. However, with the present arrangement, it is possible to retro-fit any existing helicopters by simply placing the air cells on the seat and by installing the controlling circuitry in the helicopter. Such a retro-fit, as above mentioned, is not possible with the system of the '499 patent.

In addition, as also above mentioned, it is possible to redesign the seat of the helicopter with the present arrangement without redesigning the entire helicopter structure.

As it is possible that some of the cells will be over inflated while others of the cells are under inflated due to the action of the bellows, the processing circuit must also include means for "averaging" the total effect on all of the air cells on providing an appropriate driving signal. However, in the most likely situation, all of the air cells will be effected in the same way by the vibrations and if this assumption can be made, then it is sufficient to provide a single transducer 3 in, for example, a centrally located air cell. Processing circuits for performing the above functions are well known in the art and require no further description.

The system, control circuit 9 and the servo control circuit 11 are also of the type well known in the art and could, for example, be similar to systems used in simulators wherein seats comprising a plurality of controllable air cells are utilized as in the above-mentioned references. However, in the present system, instead of having the control circuits driven by an output of a computer to simulate motion, the control circuits herein are driven by a signal which is a function of the helicopter vibrations.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A system for counteracting the effect of helicopter vibrations on a pilot sitting on a seat in the helicopter, said seat comprising a plurality of controllable air cells positioned for direct contact by said pilot for isolating said pilot from vibrations of said seat and helicopter;

said system comprising:

means for fixedly connecting said seat to said helicopter during operation thereof;

means for varying the pressure of said cells;

vibration transducer means for sensing pressure in at least one of said cells, and for providing electrical signals representative thereof;

control means for providing signals for controlling said means for varying; and processing means for processing said electrical signals and for providing driving signals for driving said control means;

wherein;

an output of said transducer means is connected to a first input of said processing means;

an output of said processing means is connected to an input of said control means;

an output of said control means is connected to said means for varying; and said means for varying is physically connected to said controllable air cells;

whereby;

the effects of helicopter vibrations are counteracted by counteracting the changes of pressure in the air cells due to the vibrations and thereby reducing or eliminating said changes in pressure of said air cells.

2. A system as defined in claim 1 wherein said means for varying comprises a plurality of bellows equal to the plurality of air cells, a respective one of said bellows being connected to a respective air cell; and a plurality of hydraulic actuators equal to the plurality of bellows, a respective one of said hydraulic actuators being connected to a respective one of said bellows.

3. A system as defined in claim 2 wherein said means for controlling comprises electronic control circuitry.

4. A system as defined in claim 3 wherein said air cell transducer means comprises a plurality of air cell transducers equal to the plurality of air cells, a respective air cell transducer being associated with a respective one of said air cells.

* * * * *